US008901466B2

(12) United States Patent
Schilling et al.

(10) Patent No.: US 8,901,466 B2
(45) Date of Patent: Dec. 2, 2014

(54) INDUCTION HEATING DEVICE AND ASSOCIATED OPERATING AND SAUCEPAN DETECTION METHOD

(75) Inventors: Wilfried Schilling, Kraichtal (DE); Ralf Dorwarth, Oberderdingen (DE); Martin Volk, Baden-Baden (DE); Tobias Schönherr, Kraichtal (DE)

(73) Assignee: E.G.O. Elektro-Geraetebau GmbH, Oberderdingen (DE)

( * ) Notice: Subject to any disclaimer, the term of this patent is extended or adjusted under 35 U.S.C. 154(b) by 817 days.

(21) Appl. No.: 12/102,172

(22) Filed: Apr. 14, 2008

(65) Prior Publication Data

US 2010/0006563 A1 Jan. 14, 2010

Related U.S. Application Data

(63) Continuation of application No. PCT/EP2006/009915, filed on Oct. 13, 2006.

(30) Foreign Application Priority Data

Oct. 14, 2005 (DE) ......................... 10 2005 050 036

(51) Int. Cl.
*H05B 6/04* (2006.01)
*H02M 3/24* (2006.01)
*H05B 6/06* (2006.01)

(52) U.S. Cl.
CPC ............ *H05B 6/062* (2013.01); *H05B 2213/05* (2013.01)
USPC ........... 219/661; 219/626; 219/627; 219/667; 219/665; 219/620; 363/96; 363/97; 363/80; 363/131

(58) Field of Classification Search
CPC ............................ H05B 2213/05; H05B 6/062
USPC ......... 219/661, 626, 627, 667, 665, 620, 625; 363/97, 80, 131, 96
See application file for complete search history.

(56) References Cited

U.S. PATENT DOCUMENTS

| | | | |
|---|---|---|---|
| 3,781,503 | A | 12/1973 | Harnden, Jr. et al. |
| 4,356,371 | A | 10/1982 | Kiuchi et al. |

(Continued)

FOREIGN PATENT DOCUMENTS

| | | |
|---|---|---|
| FR | 2447640 | 8/1980 |
| JP | 56-042984 | 4/1981 |

(Continued)

OTHER PUBLICATIONS

International Search Report from PCT/EP2006/009915 dated May 21, 2007.

(Continued)

*Primary Examiner* — Dana Ross
*Assistant Examiner* — Ket D Dang
(74) *Attorney, Agent, or Firm* — Alston & Bird LLP

(57) ABSTRACT

The invention may enable provision of a method for facilitating operation of an induction heating device, and a pot detection method for an induction heating device and to an induction heating device. The induction heating device is characterized by determining a low point of a resonant cycle on a linking node of a parallel resonant circuit and a switching element, determining a low point voltage at the low point of the resonant cycle and switching on the switching element at the low point of the resonant cycle for a cycle duration that is determined depending on the low point voltage in such a manner that a low point voltage does not exceed a predetermined maximum value in the following resonant cycles.

6 Claims, 3 Drawing Sheets

(56) References Cited

U.S. PATENT DOCUMENTS

| | | | | | |
|---|---|---|---|---|---|
| 4,429,205 | A * | 1/1984 | Cox | 219/665 |
| 4,438,311 | A | 3/1984 | Tazima et al. | |
| 5,268,547 | A * | 12/1993 | Bessyo et al. | 219/716 |
| 5,424,514 | A | 6/1995 | Lee | |
| 5,477,035 | A * | 12/1995 | Matsumoto et al. | 219/635 |
| 5,648,008 | A * | 7/1997 | Barritt et al. | 219/626 |
| 5,794,096 | A * | 8/1998 | Okabayashi | 399/33 |
| 6,943,330 | B2 * | 9/2005 | Ring | 219/661 |
| 2004/0074900 | A1 * | 4/2004 | Suenaga et al. | 219/600 |

FOREIGN PATENT DOCUMENTS

| | | | |
|---|---|---|---|
| JP | 4-196085 | | 7/1992 |
| JP | 2000-040582 | A | 2/2000 |
| WO | WO 2004/107819 | A1 | 12/2004 |

OTHER PUBLICATIONS

German Search Report from German Application No. 10 2005 050 036.6.

Japanese Patent Office, Office Action for Application No. 2008-534941, dated Jul. 31, 2012, 3 pages, Japan.

* cited by examiner

INDUCTION HEATING DEVICE AND ASSOCIATED OPERATING AND SAUCEPAN DETECTION METHOD

CROSS REFERENCE TO RELATED APPLICATIONS

This application is a continuation of PCT/EP2006/009915, filed Oct. 13, 2006, which in turn claims priority to DE 10 2005 050 036.6, filed on Oct. 14, 2005, the contents of both of which are incorporated by reference.

FIELD OF THE INVENTION

The invention relates to an induction heating device, a method for operating an induction heating device, and a method for pot or saucepan detection for an induction heating device.

BACKGROUND OF THE INVENTION

Induction cooking appliances or induction cookers are being ever more widely used. Their high efficiency and rapid reaction to a change of the cooking stage or level are advantageous. However, compared with glass ceramic hobs with radiant heaters, their disadvantage is the high price.

Induction cooking appliances normally comprise one or more induction heating devices with an induction coil associated with a given hotplate and which are subject to the action of an alternating voltage or alternating current, so that eddy currents are induced in a cooking utensil to be heated which is magnetically coupled with the induction coil. The eddy currents bring about a heating of the cooking utensil.

Numerous different circuit arrangements and drive methods are known for driving the induction coil. It is common to all the circuit and method variants that they generate a high frequency drive voltage for the induction coil from a low frequency input supply voltage. Such circuits are known as frequency converters.

For frequency converting or converting, normally the input supply or alternating supply voltage initially is rectified with the aid of a rectifier into a direct supply voltage or intermediate circuit voltage, and subsequently, for generating the high frequency drive voltage, processing takes place using one or more switching elements, generally insulated gate bipolar transistors (IGBTs). Normally a so-called intermediate circuit capacitor for buffering the intermediate circuit voltage is provided at the rectifier output, i.e. between the intermediate circuit voltage and a reference potential.

A converter variant widely used in Europe is a half-bridge circuit formed from two IGBTs, a series resonant circuit being formed by the induction coil and two capacitors, which are looped in serial manner between the intermediate circuit voltage and the reference potential. The induction coil is connected by one terminal to a connection point of the two capacitors and by another terminal to a connection point of the two IGBTs forming the half-bridge. This converter variant is efficient and reliable, but relatively expensive due to the two IGBTs required.

An optimized variant from the costs standpoint consequently uses a single switching element or IGBT, the induction coil and a capacitor forming a parallel resonant circuit. Between the output terminals of the rectifier, parallel to the intermediate circuit capacitor, are serially looped in the parallel resonant circuit of induction coil and capacitor and the IGBT. When operating this converter variant there is, however, a risk that under unfavourable operating conditions, e.g. when using an unfavourable cooking utensil, the components can become overloaded. This normally leads to a reduced service life of such induction heating devices.

The problem addressed by the invention is therefore to provide a method for operating an induction heating device, a method for saucepan detection for an induction heating device and an induction heating device, in which the induction heating devices have a frequency converter with a single switching element or IGBT and which in the case of changing operating conditions permit a reliable, component-protecting operation consistent with a long service life of the induction heating device.

SUMMARY OF THE INVENTION

The invention solves this problem by providing a method for operating an induction heating device, a method for saucepan detection for an induction heating device and an induction heating device. In one embodiment, the invention provides a method for operating an induction heating device comprising an induction coil, a capacitor connected in parallel to the induction coil, the induction coil and the capacitor forming a parallel resonant circuit, and a controllable switching element connected between an intermediate circuit voltage generated from an alternating supply voltage and a reference potential in series with the parallel resonant circuit and controlled in such a way that an oscillation of the parallel resonant circuit is caused during a heating operation, the method comprising: determining a low point of an oscillation cycle at a connection node of the parallel resonant circuit and the switching element, determining a low point voltage at the low point of the oscillation cycle, and in the low point of the oscillation cycle, switching on the switching element for an on period determined as a function of the low point voltage in such a way that a low point voltage in following oscillation cycles does not exceed a predeterminable maximum value.

In another embodiment, the invention provides a method for detecting presence of a cooking vessel for an induction heating device comprising an induction coil, a capacitor connected in parallel with the induction coil, said induction coil and said capacitor forming a parallel resonant circuit, and a controllable switching element connected between an intermediate circuit voltage and a reference potential in series with the parallel resonant circuit, the method comprising: causing an oscillation of the parallel resonant circuit by shortly closing the switching element, determining the number of oscillation cycles which occur by detecting and counting the low points of the oscillation at a connection node of the parallel resonant circuit and the switching element, and determining the presence of a cooking vessel when the number of oscillation cycles drops below a predeterminable threshold value.

In another embodiment, the invention provides an induction heating device comprising: an induction coil, a first capacitor connected in parallel with the induction coil, said induction coil and said first capacitor forming a parallel resonant circuit, a controllable switching element connected between an intermediate circuit voltage and a reference voltage in series with the parallel resonant circuit and controlled in such a way that during a heating operation an oscillation of the parallel resonant circuit is caused, a low point determination device for determining a low point of an oscillation cycle at a connection node of the parallel resonant circuit and the switching element, a low point voltage determination device for determining a low point voltage at the low point of the oscillation cycle, and a control device coupled to the low point determination device and the low point voltage determination device and arranged to control the switching element such that in the low point of the oscillation cycle the switching element is switched on for an on period determined as a function of the low point voltage in such a way that a low point voltage in following oscillation cycles does not exceed a predeterminable maximum value.

Advantageous and preferred developments of the invention form the subject matter of the further claims and are explained in greater detail hereinafter. By express reference the wording of the claims is made into part of the content of the description.

The inventive method according to one embodiment is used for operating an induction heating device with an induction coil, a capacitor connected in parallel to the induction coil, where said induction coil and said capacitor form a parallel resonant circuit, and a controllable switching element, which is looped in series with the parallel resonant circuit between an intermediate circuit voltage generated from an alternating supply voltage and a reference potential and which is controlled in such a way that during a heating operation an oscillation of the parallel resonant circuit is brought about. For operating the induction heating device a low point of an oscillating cycle is determined at a connection node of the parallel resonant circuit and the switching element, a low point voltage is determined at the low point of the oscillating cycle. The switching element is switched on in the low point of the oscillating cycle for an on period, which is established as a function of the low point voltage in such a way that a low point voltage does not exceed a predeterminable maximum value in the following oscillating cycles. In embodiments of the invention, the maximum value is preferably lower than 50 V, particularly preferably lower than 10 V. This permits a particularly component-protecting and therefore low-wear operation of the induction heating device, because the switching element is switched on just when no or only a limited voltage is present at the connecting node of the parallel resonant circuit and the switching element.

Thus, in embodiments of the invention a switching through of the switching element only generates a negligible or no current peak in the actual switching element and in the components of the induction heating device. Through the appropriate choice of the on period the resonant circuit in the charging phase is only supplied with sufficient energy for the voltage at the connection node of the parallel resonant circuit and the switching element in the following oscillating cycle to oscillate through again to the desired voltage value, i.e. the low or reversal point has the desired voltage level. If the on period is chosen too short, the voltage at the connection node in the following oscillation cycle in the low point has an excessive value, so that on switching through the switching element a current peak occurs. If the on period is chosen too long, a maximum current loading of the components, e.g. the switching element, can be exceeded, so that damage may occur to the same. In embodiments of the invention the reference voltage is preferably the earth or ground potential.

The switching element can be constituted by all suitable voltage-proof switching elements and in particular high voltage-proof insulated gate bipolar transistors (IGBTs). The switching on time of the switching element is consequently synchronized with the oscillation low points, the voltage level at the switching on point being used for determining the on period.

In a further embodiment of the method the on period is so determined or set, that a low point voltage in the following oscillation cycles is equal to the reference voltage. In this case there is a virtually currentless switching on process of the switching element.

In a further embodiment of the method the on period is increased compared with the on period of a preceding oscillation cycle if the low point voltage exceeds a predetermined threshold value. This makes it possible to obtain a stepwise adaptation or regulation of the low point voltage. If the low point voltage in an oscillation cycle n is too high, this means that in an oscillation cycle n−1 too little energy has been fed into the resonant circuit, i.e. the on period was too short. Thus, the on period must be increased, e.g. with a predetermined step width. If in the oscillation cycle n+1 the low point voltage again exceeds the threshold value, the on period is again increased. This process is repeated until the low point voltage has reached the desired value, ideally 0 V. Starting from a low point voltage of 0 V, the on period can obviously be reduced during following oscillation cycles until the low point voltage is e.g. somewhat higher than 0 V, but lower than an adjustable threshold value. This allows a dynamic tracking or follow-up of the on period if the resonant circuit parameters, e.g. due to a shifting of a cooking vessel on a hotplate, are subject to change.

In a further embodiment of the method the low point of the oscillation or the given oscillation cycles is determined by deriving or differentiating a voltage gradient at the connection node of the parallel resonant circuit and the switching element. Through differentiation it is possible to easily determine the low point of the voltage gradient or an oscillation cycle, because there the differentiation value is zero.

In a further embodiment of the method no low point determination takes place when the switching element is switched on. This makes it possible to prevent the suppression of low points in the voltage gradient caused by a switching on of the switching element, because they are normally not necessary for evaluation or even interfere with the latter.

In a further embodiment of the method the low point voltage is compared with a reference voltage, and as a function of the result of the comparison, a comparison signal is produced indicating whether the low point voltage is higher or lower than the reference voltage. Preferably the reference voltage is generated as a function of the switching state of the switching element.

In a further embodiment of the method determination takes place as to whether there is a cooking vessel on the cooking surface or heating zone associated with the induction heating device, a cooking vessel being detected if in the range of a zero passage of the alternating supply voltage it is not possible to determine low points of oscillation cycles at the connection node of the parallel resonant circuit and the switching element. The damping of the resonant circuit is highly dependent on whether or not there is a cooking vessel in a heating zone of the induction heating device. If a magnetically acting cooking vessel is placed on a cooking surface, resonant circuit damping strongly increases, because energy is removed from the resonant circuit and absorbed by the cooking vessel. In this case the intermediate circuit voltage in the vicinity of a zero passage of the alternating supply voltage decreases so strongly that there is no longer the formation of an oscillation with detectable low points. If in the vicinity of the supply voltage zero passage it is no longer possible to detect low points, it can be concluded therefrom that a cooking vessel is present. This is possible continuously, also during active heating operation.

In the inventive method for saucepan detection for an induction heating device, which in one embodiment largely corresponds to the above-described induction heating device, the switching element is briefly closed, which excites an oscillation of the parallel resonant circuit. The number of oscillation cycles which occur is established by determining and counting the low points of the oscillation at a connection node of the parallel resonant circuit and the switching element. The presence of a cooking vessel or pot is determined as a function of whether the number of oscillation cycles drops below a predeterminable threshold value. As stated hereinbefore, resonant circuit damping is dependent on whether or not there is a cooking vessel in a heating zone of the induction heating device. If a magnetically acting cooking vessel is placed on a hotplate or in a heating zone, the resonant circuit damping increases sharply. In this case, even after a few oscillation cycles or periods it is no longer possible to detect an oscillation and therefore also not possible to detect oscillation low points. If no cooking vessel is placed on a hotplate, the oscillation and therefore the oscillation low points can be detected for a much longer time, i.e. the number of counted or countable low points is much larger than for more strongly damped oscillation with a cooking vessel present. The number of counted low points can therefore be used to indicate the presence of a cooking vessel.

The inventive induction heating device, which is particularly suitable for performing one of the aforementioned methods, comprises in one embodiment an induction coil, a capacitor connected in parallel to the induction coil, said induction coil and said capacitor forming a parallel resonant circuit, and a controllable switching element looped in, in series, with the parallel resonant circuit between an intermediate circuit voltage and a reference voltage, and which is controlled in such a way that during a heating operation the parallel resonant circuit is made to oscillate. According to an embodiment of the invention there is a low point determination device for determining a low point of an oscillation cycle at a connection node of the parallel resonant circuit and the switching element, a low point voltage determination device for determining a low point voltage at the low point of the oscillation cycle, and a control device coupled to the low point determination device and the low point voltage determination device and which is set up in such a way that the switching element is switched on for an on period in the oscillation cycle low point and which is established as a function of the low point voltage, in such a way that a low point voltage in the following oscillation cycles does not exceed a predeterminable maximum value. The control unit can e.g. be a microcontroller.

In a further embodiment of the induction heating device the low point determination device comprises a first capacitor, a first resistor, an overvoltage suppressor, for example a Zener diode, and a second resistor, the first capacitor, the first resistor and the overvoltage suppressor being looped in serially between the connection node of the parallel resonant circuit and the switching element and a reference potential, and the second resistor being looped in between a supply voltage and a connection node of the first resistor and the overvoltage suppressor. A low point signal is present at the connection node of the first resistor and the overvoltage suppressor and said signal indicates a low point. The components form a differentiator, which differentiates or derives a voltage gradient at the connection node of the parallel resonant circuit and the switching element. This makes it easily possible to implement a low point detection of the voltage gradient, because at the transition from a negative to a positive slope of the voltage gradient, a rising slope of the low point signal is produced. As a result of the second resistor, in the case of a constant voltage at the connection node, the low point signal is raised to a supply voltage level.

In a further embodiment of the induction heating device the low point voltage determination device comprises a voltage divider looped in between the connection node of the parallel resonant circuit and the switching element and a reference potential, and which produces a divided down resonant circuit voltage, a reference voltage generating device for generating a reference voltage, and a comparator, which is supplied with the resonant circuit voltage and the reference voltage and as a function thereof generates a comparator signal indicating whether the resonant circuit voltage is higher or lower than the reference voltage. Preferably the low point determination device comprises a delay element, which outputs the resonant circuit voltage with a time delay to the comparator. This permits a facilitated evaluation of the comparator signal in the control unit.

In a further embodiment of the induction heating device the reference voltage generating device is set up in such a way that the reference voltage is generated as a function of the switching state of the switching element.

These and further features can be gathered from the claims, description and drawings and the individual features, both singly or in the form of subcombinations, can be implemented in an embodiment of the invention and in other fields and can represent advantageous, independently protectable constructions for which protection is claimed here. The subdivision of the application into individual sections and the subheadings in no way restrict the general validity of the statements made thereunder.

BRIEF DESCRIPTION OF THE DRAWINGS

Embodiments of the invention are described hereinafter relative to the attached diagrammatic drawings, wherein show.

DETAILED DESCRIPTION OF THE EMBODIMENTS

Figure 1:
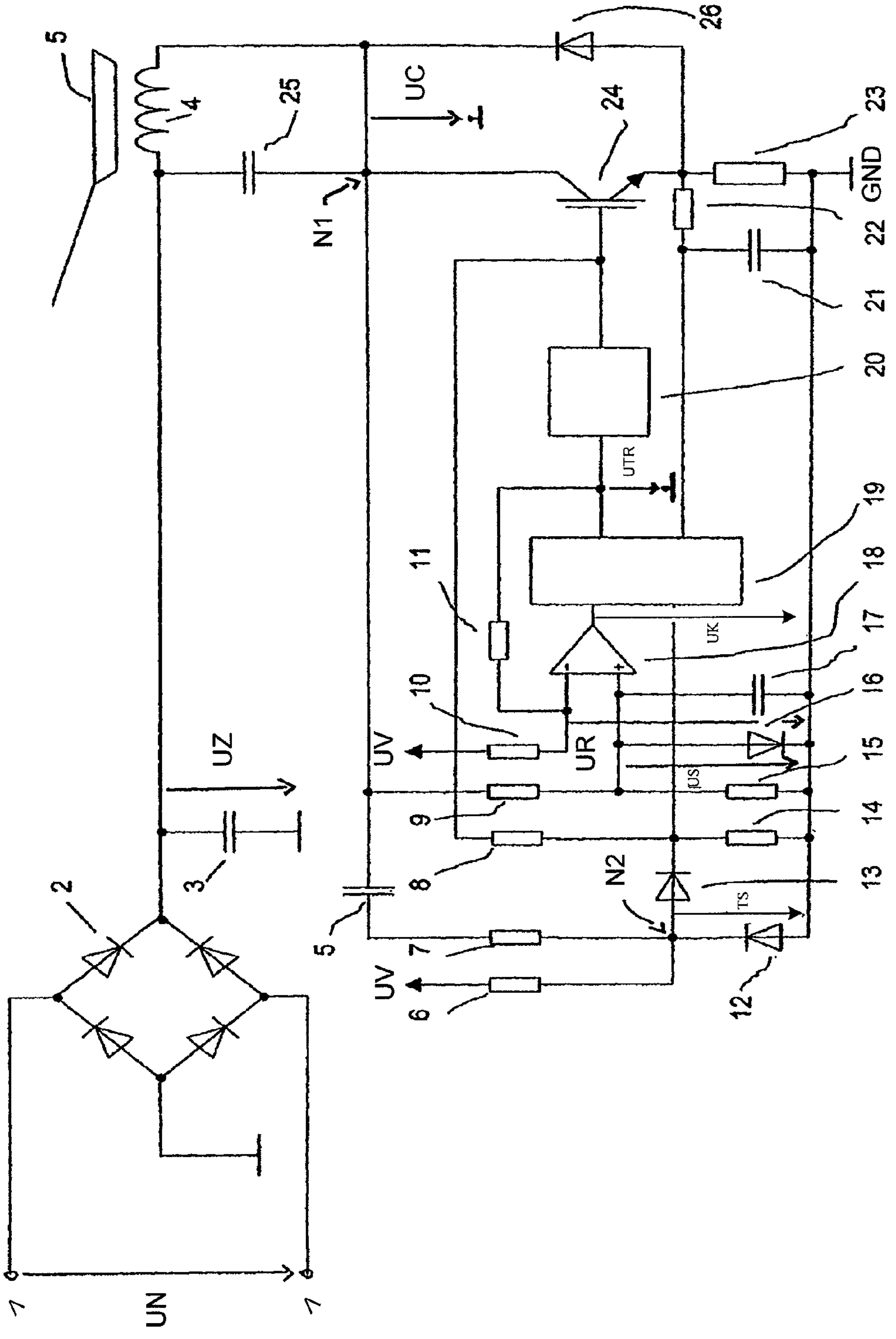
FIG. 1 is a circuit diagram of an embodiment of an induction heating device.

FIG. 1 shows a circuit diagram of an embodiment of an induction heating device with connecting terminals 1 for the connection of an alternating supply voltage UN, e.g. of 230 V, 50 Hz supply frequency and which is rectified by a bridge rectifier 2. A so-called intermediate circuit voltage UZ is applied to an output of the bridge rectifier 2 and this is buffered by an intermediate circuit capacitor 3.

An induction coil 4 and a capacitor 25 are connected in parallel and form a parallel resonant circuit. A controllable switching element in the form of an IGBT 24 and a current sensing resistor 23 are looped in serially with the parallel resonant circuit between the intermediate circuit voltage UZ and a reference potential in the form of the earth or ground voltage GND. The IGBT 24 is controlled by a control unit in the form of a microcontroller 19 and for generating the necessary drive level of the IGBT 24 a drive circuit 20 is looped in between a control output of microcontroller 19 and the gate terminal of the IGBT 24. A freewheeling diode 26 is connected in parallel to the collector-emitter junction of the IGBT 24. A measuring voltage at the current sensing resistor 23 is filtered by a RC filter from resistor 22 and capacitor 21 and applied to an associated input of microcontroller 19.

Following the application of the alternating supply voltage UN, or if the induction heating device is not subject to a heating operation, the intermediate circuit capacitor 3 is charged to a peak value of the alternating supply voltage UN, e.g. 325 V in the case of a 230 V alternating supply voltage. If the IGBT 24 is switched on starting from this state, a voltage UC at the collector of the IGBT or at a connection node N1 of the parallel resonant circuit and the IGBT assumes roughly a ground potential GND, because the current sensing resistor 23 is dimensioned in very low resistance manner.

Therefore the capacitor 25 is charged to the value of the intermediate circuit voltage UZ. As the induction coil 4 is also supplied with the intermediate circuit voltage UZ, there is a linear current rise through the induction coil 4, so that magnetic energy is stored in the coil.

If the IGBT 24 is switched off, an oscillation is formed in the resonant circuit whose amplitude at the collector of IGBT 24 can rise well above the value of the intermediate circuit voltage UZ. This oscillation e.g. induces in a bottom of a cooking vessel 5 standing over induction coil 4 an eddy current which brings about the heating thereof. As a result energy is extracted from the resonant circuit and the oscillation is damped.

Ideally the induction heating device is so operated and the IGBT 24 so controlled that the resonant circuit during the charging phase, i.e. with the IGBT 24 switched through, is supplied with just enough energy for the voltage UC at node N1 or at the collector of IGBT 24 to oscillate through in a following oscillation cycle to the ground potential GND. For this purpose there must be an appropriate choice of the on period of IGBT 24. Just when voltage UC at node N1 has reached its lowest potential, i.e. in the low point of an oscillation cycle, IGBT 24 should be switched on again in order to recharge the resonant circuit for the following oscillation cycle or following period. If in the low point the voltage UC at node N1 oscillates through to ground potential, on switching on IGBT 24 there are no switch-on current peaks through IGBT 24 or capacitor 25, which ensures a component-protecting operation.

However, if in a preceding oscillating cycle, insufficient energy has been transferred into the resonant circuit, i.e. the on period has been chosen too short, the voltage UC at node N1 does not oscillate through to ground potential GND, so that prior to the switching on of IGBT 24 in the oscillation low point, there is a voltage difference between collector and emitter of IGBT 24 or ground. When IGBT 24 is switched on, this leads to a current peak through IGBT 24 and capacitor 25, because for the voltage jump at its terminal, capacitor 25 virtually represents a short-circuit and is very rapidly charged. This is prejudicial both to IGBT 24 and capacitor 25 and leads to a reduced service life of said components.

In order to permit a switching on of IGBT 24 in the low point of an oscillation cycle at node N1, a low point determination device is provided in the form of a capacitor 5, a resistor 7, an overvoltage suppressor in the form of a Zener diode 12 and a resistor 6, the capacitor 5, resistor 7 and Zener diode 12 being looped in serially between the connection node N1 and ground potential GND, and resistor 6 being looped in between a supply voltage UV and a connection node N2 of resistor 7 and Zener diode 12. A signal or a voltage TS is present at connection node N2 and its curve indicates a low point.

The voltage UC at node N1 or between the collector and emitter of IGBT 24 is derived or differentiated by capacitor 5, resistor 7 and resistor 6. That is, during or shortly after the low point of an oscillation cycle at node N1, a rising slope of voltage TS arises. The Zener diode 12 limits the occurring voltage level of voltage TS to values which can be processed by microcontroller 19, e.g. to approximately 0.6 to 5.6 V. With a rising oscillation at node N1 the voltage TS e.g. assumes values of approximately +5 V and with a falling oscillation e.g. values of approximately −0.6 V.

If there is no change to the voltage UC at node N1, e.g. if IGBT 24 is switched on, a positive potential is applied across resistor 6 to the cathode of Zener diode 12. Therefore there is a positive voltage slope at Zener diode 12 or voltage TS, if the differentiated voltage at node N1 changes from negative values to positive values or from negative values to a value of zero. The voltage TS is transmitted for evaluation across a diode 13 to an associated input of microcontroller 19.

Thus, by means of a rising slope of voltage TS, microcontroller 19 can detect a low point of an oscillation cycle at node N1 and switch on the IGBT 24 synchronously to the low point.

However, if at the switching on point the voltage UC at node N1 is higher than 0 V, as a result of the switching on of IGBT 24, there is initially a negative slope of voltage UC at node N1, so that the signal TS again passes to a low level from a positive level resulting from the previously detected low point. Since in the case of switched through IGBT 24, the voltage UC at node N1 remains roughly constant at ground potential, due to the resistor 6 there is again a positive slope of voltage TS. This would indicate a further oscillation low point to microcontroller 19. However, as the low point has not been caused by the oscillation, but by the switching on of the IGBT at voltages higher than 0 V, said second positive slope of voltage TS is not transmitted to microcontroller 19.

For this purpose a drive voltage of IGBT 24 is divided down and coupled back to an evaluatable level by a voltage divider formed from resistors 8 and 14. The diode 13, which is looped in between voltage TS and the associated input of microcontroller 19, in conjunction with the coupled back drive voltage, leads to the second rising slope of voltage TS being transmitted to the input of microcontroller 19. Thus, there is no low point determination with the IGBT 24 switched on.

To determine the voltage UC at node N1 in the low point of an oscillation cycle (the determined voltage at the low point forming the basis for the calculation of the on period of IGBT 24), there are provided a low point voltage determination device in the form of a voltage divider formed by resistors 9 and 15 looped in between the connection node N1 and ground GND (generating a divided down resonant circuit voltage US), a reference voltage generating device with resistors 10 and 11 (for generating a reference voltage UR), and a comparator 18, which is supplied with the resonant circuit voltage US and reference voltage UR and as a function thereof generates a comparator signal UK indicating whether the resonant circuit voltage US is higher or lower than reference voltage UR and is applied to an associated input of microcontroller 19 for evaluation purposes.

The resonant circuit voltage US is limited by a diode 16 to approximately 0.7 V and is looped in between the input of comparator 18 to which the resonant circuit voltage US is applied and ground GND. A capacitor 17 connected in parallel to diode 16 ensures that the change to the voltage UC at node N1 is only effective with a slight delay at the input of comparator 18.

The resistors 10 and 11 for generating reference voltage UR are serially looped in between the control output of microcontroller 19 for controlling or driving IGBT 24 and the supply voltage UV, the reference voltage UR being at the connection node between resistors 10 and 11. Reference voltage UR is consequently generated as a function of the switching state of the switching element or the level of a voltage UTR at the control output of microcontroller MC. Resistors

10 and 11 are dimensioned in such a way that, with the IGBT 24 switched on, the reference voltage UR is lower than the forward voltage of diode 16 and with the IGBT 24 switched off is higher than the forward voltage of diode 16.

Thus, with the IGBT 24 switched off, independently of the voltage UC at node N1, the comparator signal UK always indicates that the resonant circuit voltage US is lower than the reference voltage UR.

With IGBT 24 switched on, at the end of the time lag of the voltage at node N1 or the resonant circuit voltage US produced by capacitor 17, the resonant circuit voltage US is approximately 0 V, because with the IGBT 24 switched on or through approximately 0 V is present at the collector or at node N1. Thus, at the end of the time lag, the comparator signal UK always indicates that the resonant circuit voltage US is lower than the reference voltage UR.

Since, as a result of capacitor 17, the resonant circuit voltage US is always applied with a delay to comparator 18, a value of the resonant circuit voltage US belonging to a switching on time of IGBT 24 is compared with a reference voltage value belonging to a switched on IGBT 24. Thus, as a result of the delay of the resonant circuit voltage US on switching on IGBT 24 there is a pulse of comparator signal UK if the resonant circuit voltage US at the time of switching on is higher than the reference voltage UR with IGBT 24 switched on. This pulse indicates to microcontroller 19 that the voltage UC at node N1 in the oscillation cycle low point is higher than a maximum value corresponding to the reference voltage value.

This means that the energy fed into the resonant circuit during the preceding on period was not sufficient to allow the voltage UC at node N1 to oscillate through to ground potential GND. Thus, compared with the preceding oscillation cycle the on period is increased. If the voltage UC at node N1 in the low point of a following oscillation cycle is lower than the maximum value corresponding to the reference voltage value, the on period remains constant. The described method steps are repeated periodically.

In summarizing, the induction heating device is operated in such a way that the switching on time of the IGBT 24 is synchronized with the low point of voltage UC at node N1 or the collector voltage. The on period or switching off time of the IGBT 24 is determined by the minimum resonant circuit energy necessary for oscillating through voltage UC at node N1 to ground potential with IGBT 24 switched off. For determining the associated on period the microcontroller 19 increases the on period of IGBT 24 until the voltage UC at the switching on time, i.e. in the oscillation low point, is lower than a predefined value close to 0 V. This on period or this operating point corresponds to the lowest continuous power output. Lower power levels are set by the use of the conventional, so-called ⅓ or ⅔ half-wave operation and optionally additional cycles of the IGBT 24 by periodic switching on and off. A power increase within a half-wave is possible through increasing the on period to beyond the aforementioned minimum on period.

Figure 2:
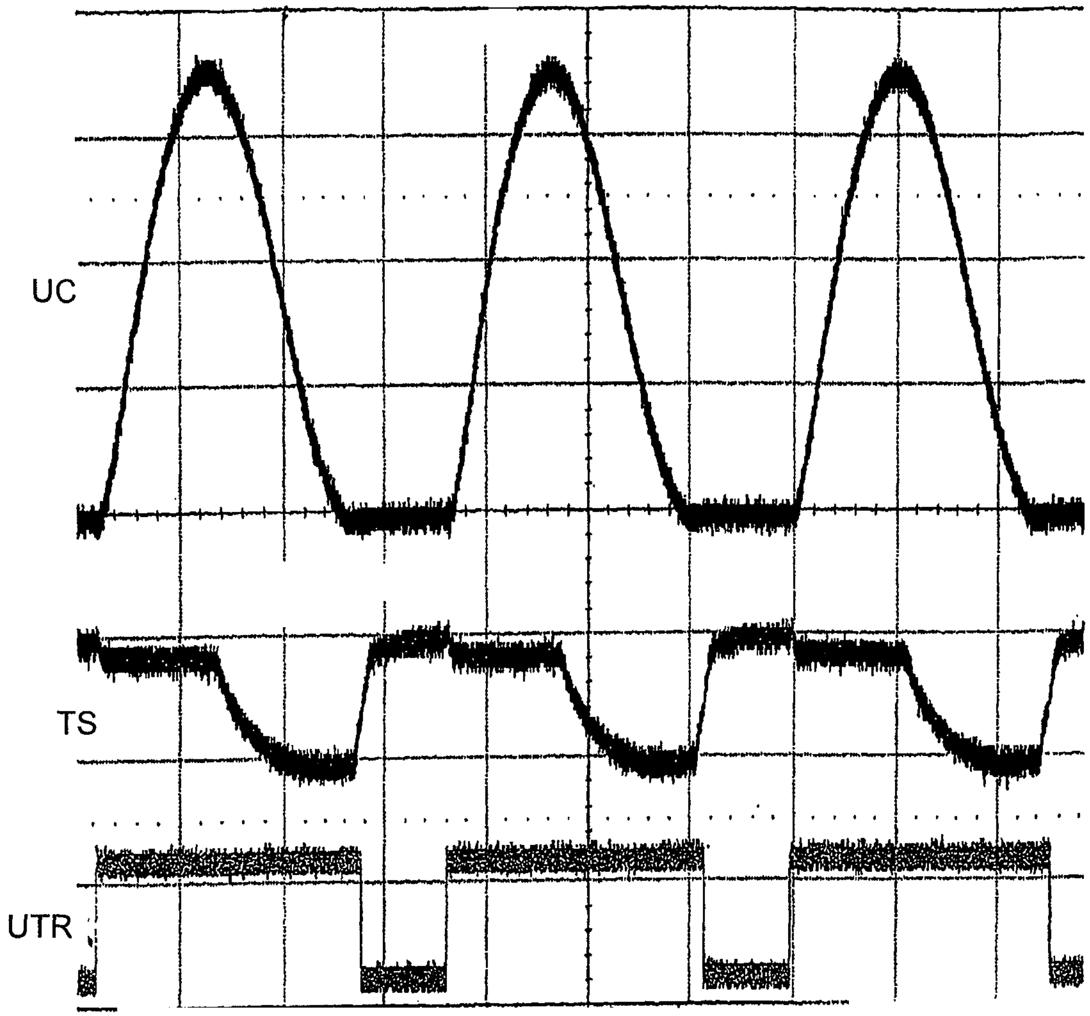
FIG. 2 shows signal curves of signals of the induction heating device of FIG. 1 during a heating operation.

For illustrating the operation of the induction heating device, FIG. 2 shows the voltage UC, the signal or voltage TS and the voltage UTR at the control output of micro-controller 19 used for controlling or driving driver 20 or IGBT 24. A low level of voltage UTR brings about a switching through of IGBT 24 and a high level leads to a blocking action. With IGBT 24 switched on, the voltage UC is approximately 0 V and the voltage TS approximately 5 V.

As soon as IGBT 24 is switched off, voltage UC increases roughly sinusoidally in a first oscillation cycle. Voltage TS remains unchanged at approximately 5 V. When voltage UC has exceeded its peak value, it decreases sinusoidally to approximately 0 V. Voltage TS drops slowly to approximately 0 V.

At the low point of the first oscillation cycle there is a positive slope of voltage TS indicating the low point to microcontroller 19. Consequently this changes the voltage UTR at its control output and in the case shown a level of 0 V of voltage UTR brings about a switched on IGBT 24. The IGBT remains switched on or the voltage UTR remains at a level of 0 V until the energy fed into the resonant circuit is just sufficient for the voltage UC to oscillate through again to 0 V in a following, second oscillation cycle. The method described is repeated for the following oscillation cycles.

For saucepan or pot detection, i.e. for establishing whether the cooking vessel 5 is located in a heating zone associated with induction coil 4, in the vicinity of the zero passages of the input supply voltage UN monitoring takes place to establish whether low points can be determined, i.e. whether rising slopes of the voltage TS occur within a time interval in which experience has shown that rising slopes must occur. If a cooking vessel 5 is present the resonant circuit is highly damped, i.e. the intermediate circuit capacitor 3 is approximately completely discharged in the zero passage area. In this case the intermediate circuit voltage UZ is no longer adequate for generating rising slopes of voltage TS in the supply zero passage area. This can be used for saucepan detection during active heating operation.

Figure 3:
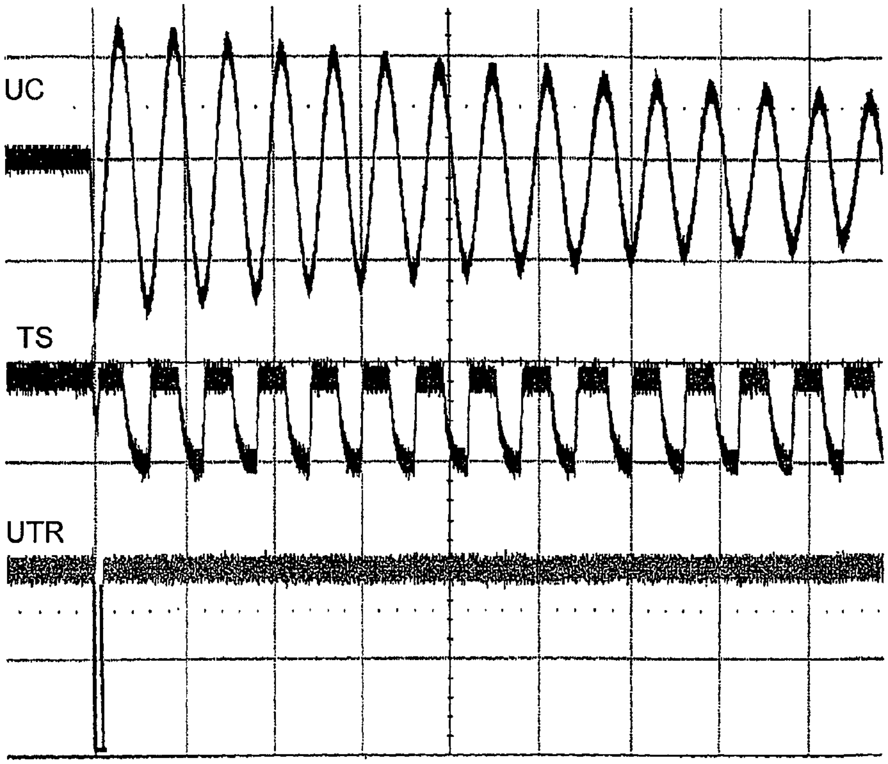
FIG. 3 shows signal curves of the signals of FIG. 2 during a saucepan detection, when no saucepan is present.
Figure 4:
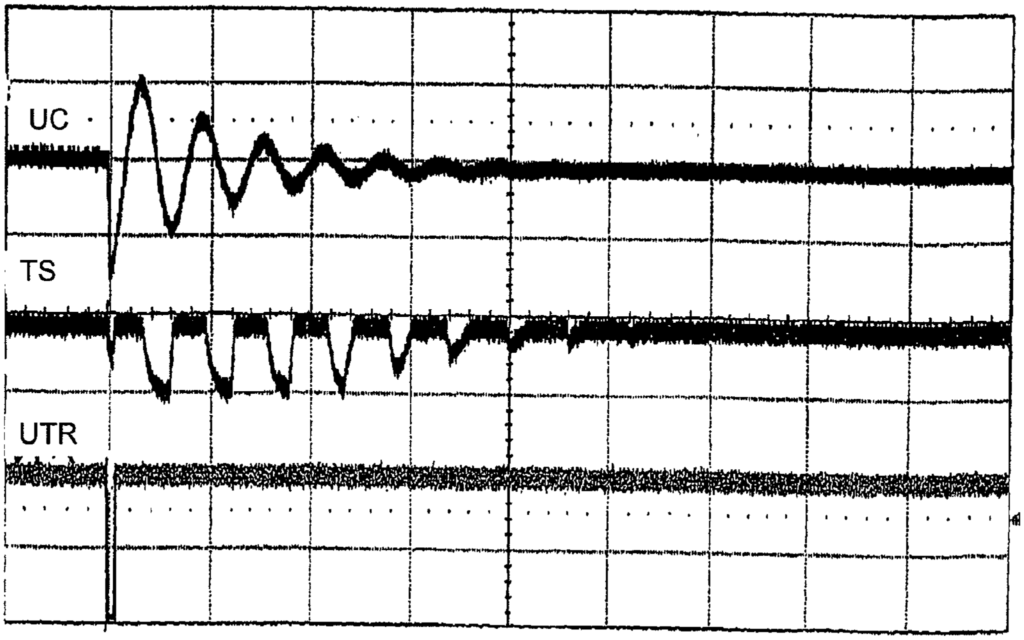
FIG. 4 shows signal curves of the signals of FIG. 2 during a saucepan detection when a saucepan is present.

For saucepan detection with non-active heating operation, e.g. if an operator sets a desired heating power of a hotplate and for enabling a heating power generation it is necessary to establish whether there is a cooking vessel 5 on the hotplate, use can be made of the method illustrated in FIGS. 3 and 4.

FIG. 3 shows signal curves of signals of FIG. 2 during saucepan detection, when no saucepan is present, whilst FIG. 4 shows signal curves during saucepan detection when a saucepan is present.

At the start of saucepan detection, initially through a brief voltage pulse of voltage UTR, IGBT 24 is briefly switched through which excites an oscillation of the parallel resonant circuit. A positive slope of voltage TS is generated in each low point of the oscillation cycle of voltage UC. Microcontroller 19 counts the positive slopes and therefore the number of oscillation cycles which occur.

Since due to the absence of a cooking vessel the resonant circuit damping is limited in FIG. 3, a large number of slopes are counted. Due to the strong damping of the resonant circuit in FIG. 4 only approximately five rising slopes are detectable there.

If a threshold value of e.g. ten slopes is fixed for saucepan detection, in FIG. 3 the slopes or number of low points exceed the fixed threshold value, i.e. by definition there is no cooking vessel in the heating zone. As the number of slopes in FIG. 4 is below the threshold value, it can be concluded that there is a cooking vessel in the heating zone.

The evaluation of the low points or the use of the low point determination device can consequently be used for the optimum operation of the induction heating device and for saucepan detection during a heating operation and also for saucepan detection for enabling the heating operation.

The embodiments shown permit a reliable, component-protecting operation of the induction heating device although the latter has a frequency converter with a single switching element or single IGBT.

The invention claimed is:

1. A method for operating an induction heating device, the induction heating device including, an induction coil, a capacitor connected in parallel to the induction coil, the induction coil and the capacitor forming a parallel resonant circuit, and a controllable switching element connected between an intermediate circuit voltage generated from an alternating supply voltage and a reference potential in series with the parallel resonant circuit and controlled in such a way that an oscillation of the parallel resonant circuit is caused during a heating operation, the method comprising the steps of:

determining a low point of an oscillation cycle at a connection node of the parallel resonant circuit and the switching element;

determining a low point voltage at the low point of the oscillation cycle;

switching on the switching element, in the low point of the oscillation cycle, for an on period determined as a function of the low point voltage in such a way that at least one low point voltage in one or more following oscillation cycles does not exceed a predetermined maximum value;

comparing the low point voltage with a reference voltage and a comparison signal is generated as a function of the comparison result indicating whether the low point voltage is higher or lower than the reference voltage;

increasing the on period in an instance in which the comparison signal indicates that the low point voltage is higher than the reference voltage; and generating the reference voltage as a function of the switching state of the switching element.

2. The method according to claim 1, further comprising:

determining the on period in such a way that the at least one low point voltage in the following oscillation cycles is equal to the reference potential.

3. The method according to claim 1, further comprising:

determining the low point of the oscillation by deriving a voltage gradient at the connection node of the parallel resonant circuit and the switching element.

4. The method according to claim 1, wherein there is no low point determination with the switching element switched on.

5. The method according to claim 1, further comprising:

determining whether a cooking vessel is located on a cooking surface or heating zone associated with the induction heating device, the cooking vessel being detected in an instance in which in the vicinity of a zero passage of the alternating supply voltage it is not possible to determine low points of oscillation cycles at the connection node of the parallel resonant circuit and the switching element.

6. A method for detecting presence of a cooking vessel for an induction heating device, the induction heating device including, an induction coil, a capacitor connected in parallel with the induction coil said induction coil and said capacitor forming a parallel resonant circuit, and a controllable switching element connected between an intermediate circuit voltage and a reference potential in series with the parallel resonant circuit, the method comprising the steps of:

causing an oscillation of the parallel resonant circuit by shortly closing the switching element;

determining a number of oscillation cycles which occur by detecting and counting the low points of the oscillation at a connection node of the parallel resonant circuit and the switching element; and determining the presence of the cooking vessel in an instance in which the number of oscillation cycles drops below a predetermined threshold value.

* * * * *